Figure 1:
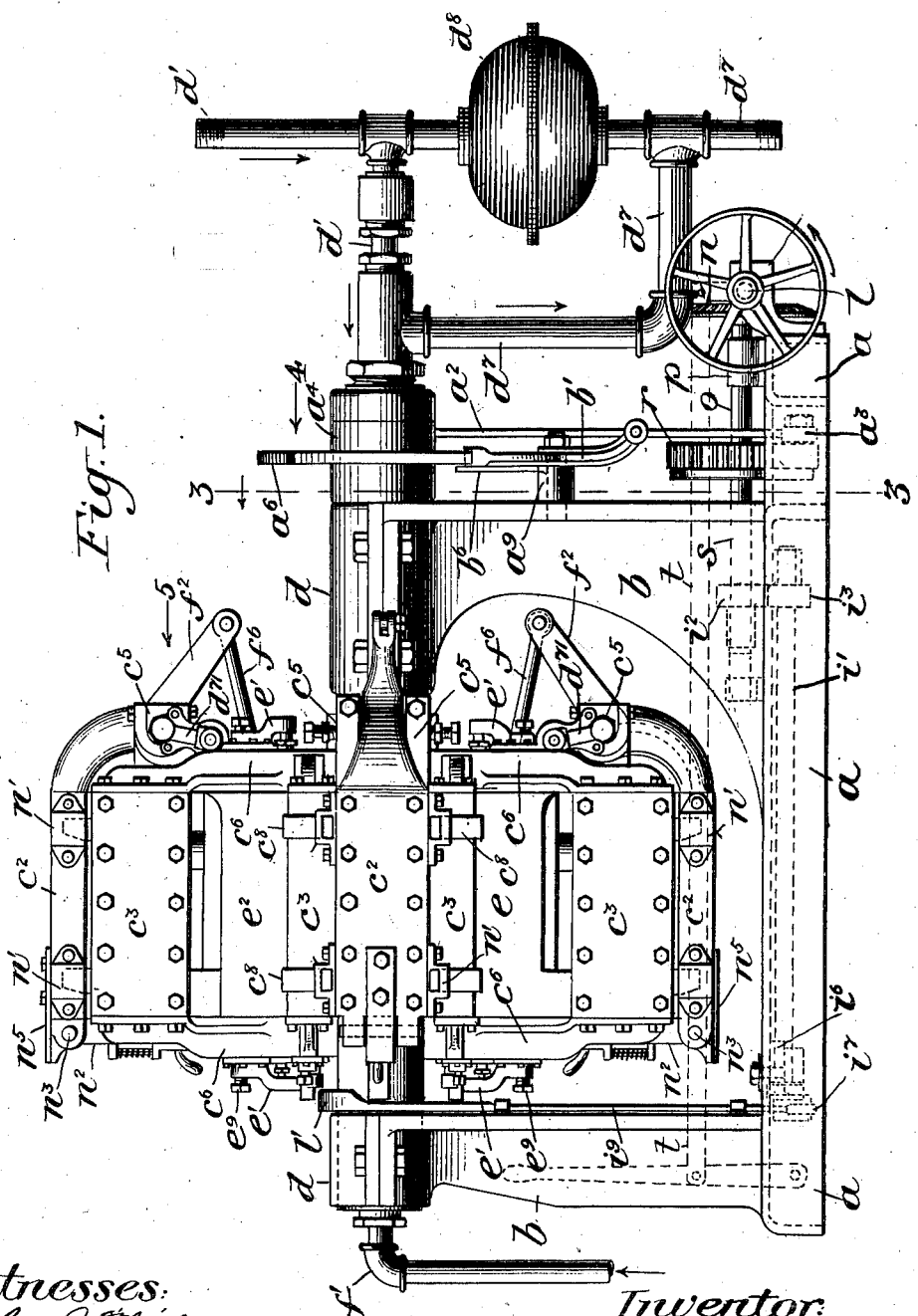

A. SCHULZE.
MANUFACTURE OF RUBBER SHOES, BOOTS, AND THE LIKE.
APPLICATION FILED AUG. 26, 1903. RENEWED NOV. 13, 1908.

1,032,626.

Patented July 16, 1912.
14 SHEETS—SHEET 1.

Witnesses:
Chas. J. O'Neill
J. M. Wrenn

Inventor:
Andrew Schulze
by Bennett & Goldsborough,
Attys.

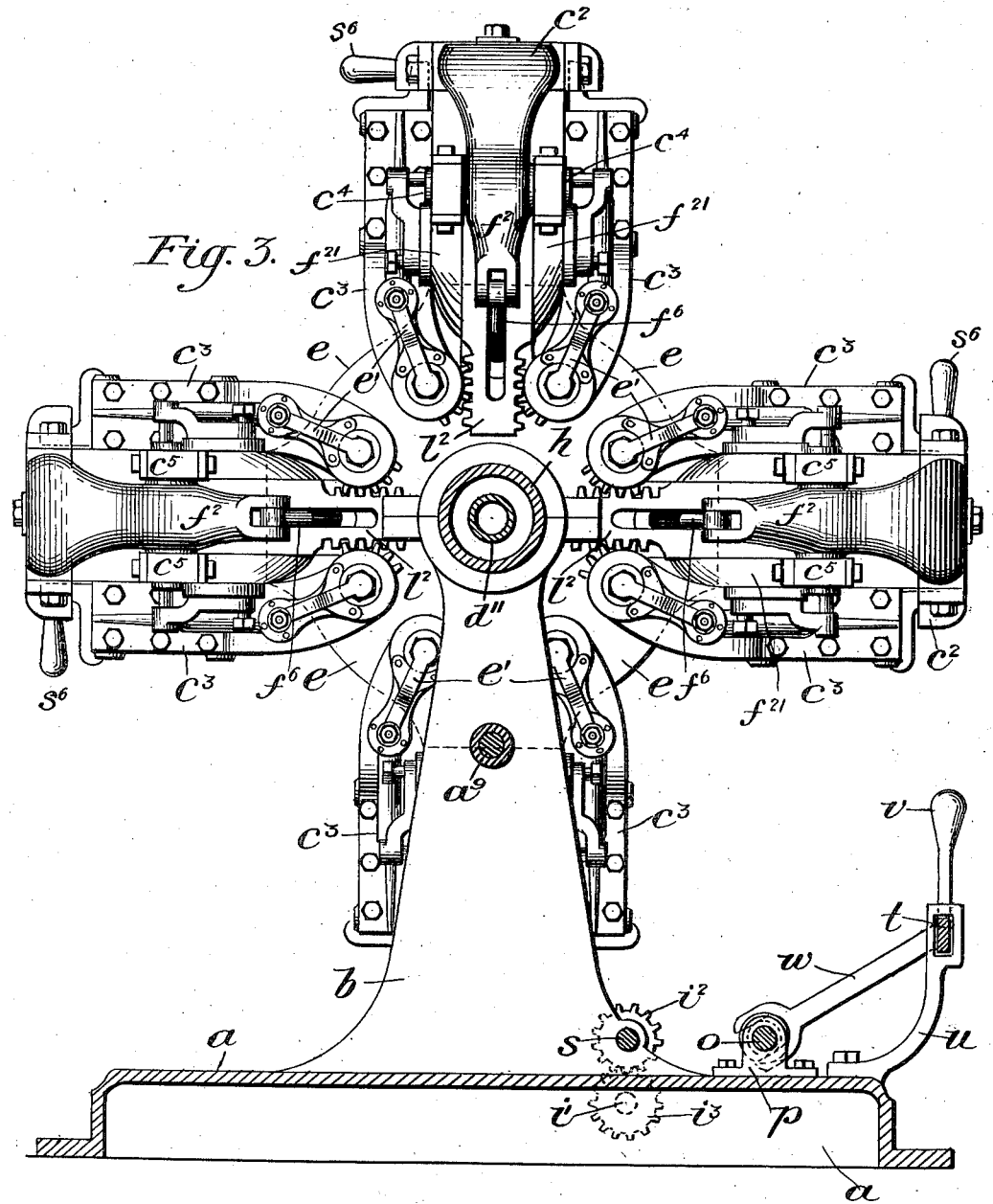

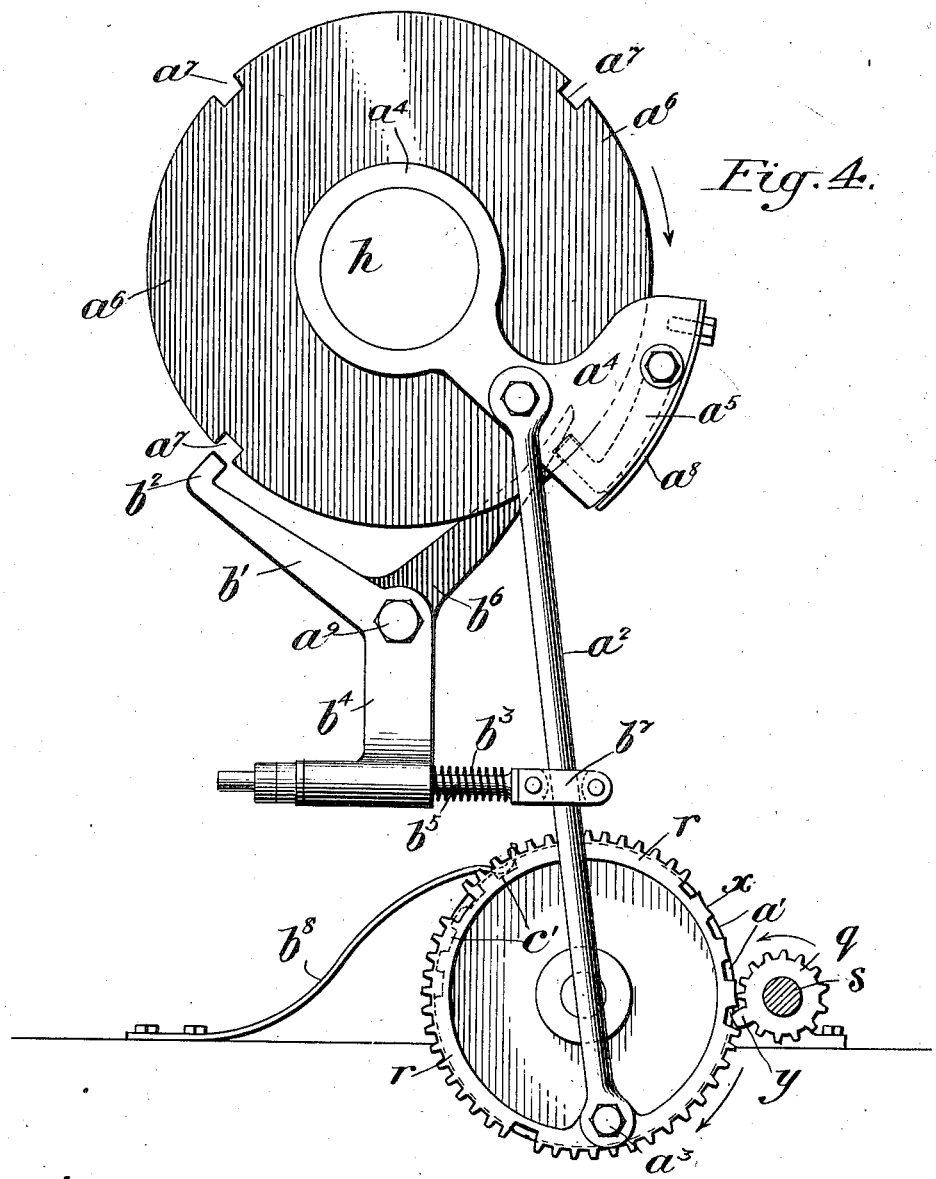

A. SCHULZE.
MANUFACTURE OF RUBBER SHOES, BOOTS, AND THE LIKE.
APPLICATION FILED AUG. 26, 1903. RENEWED NOV. 13, 1908.
1,032,626.
Patented July 16, 1912.
14 SHEETS—SHEET 5.
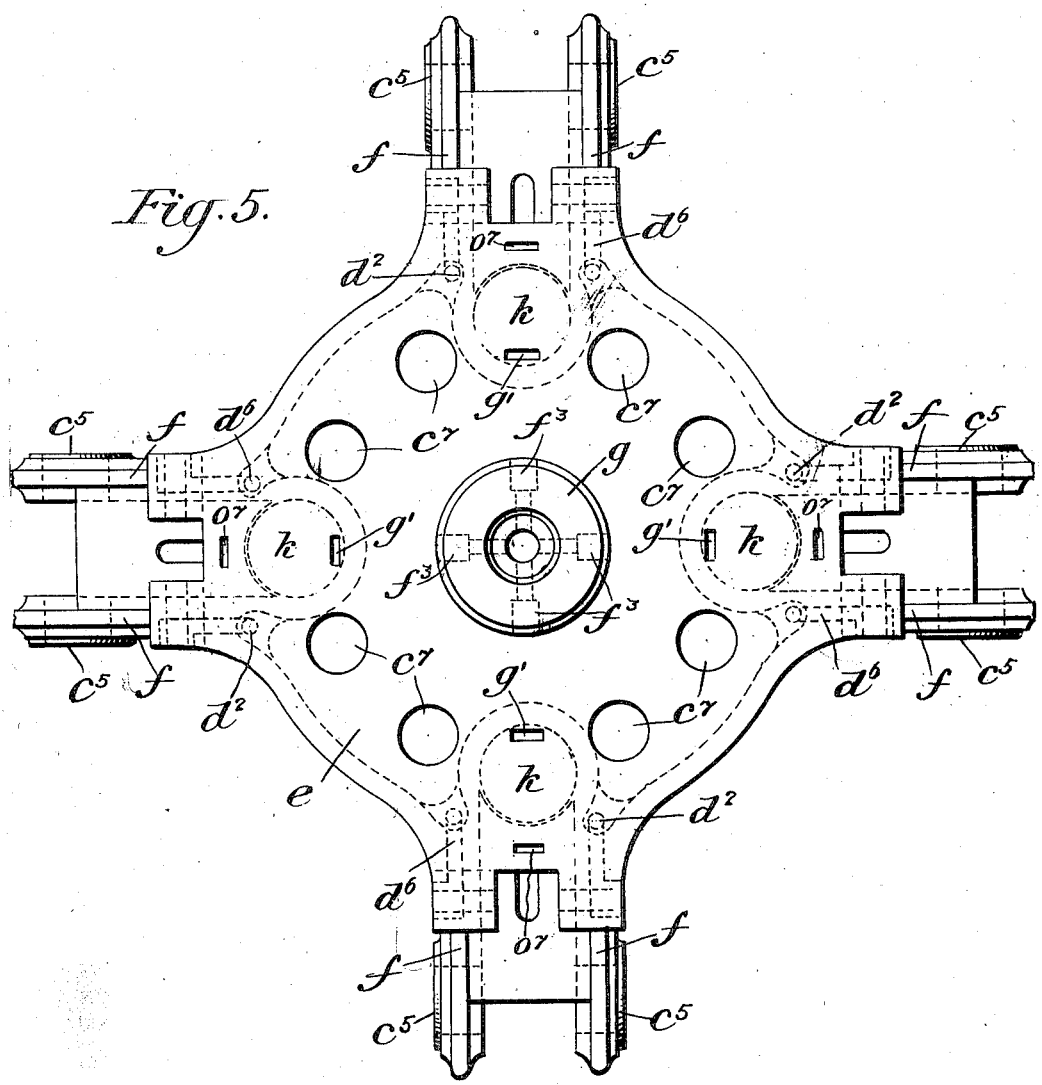

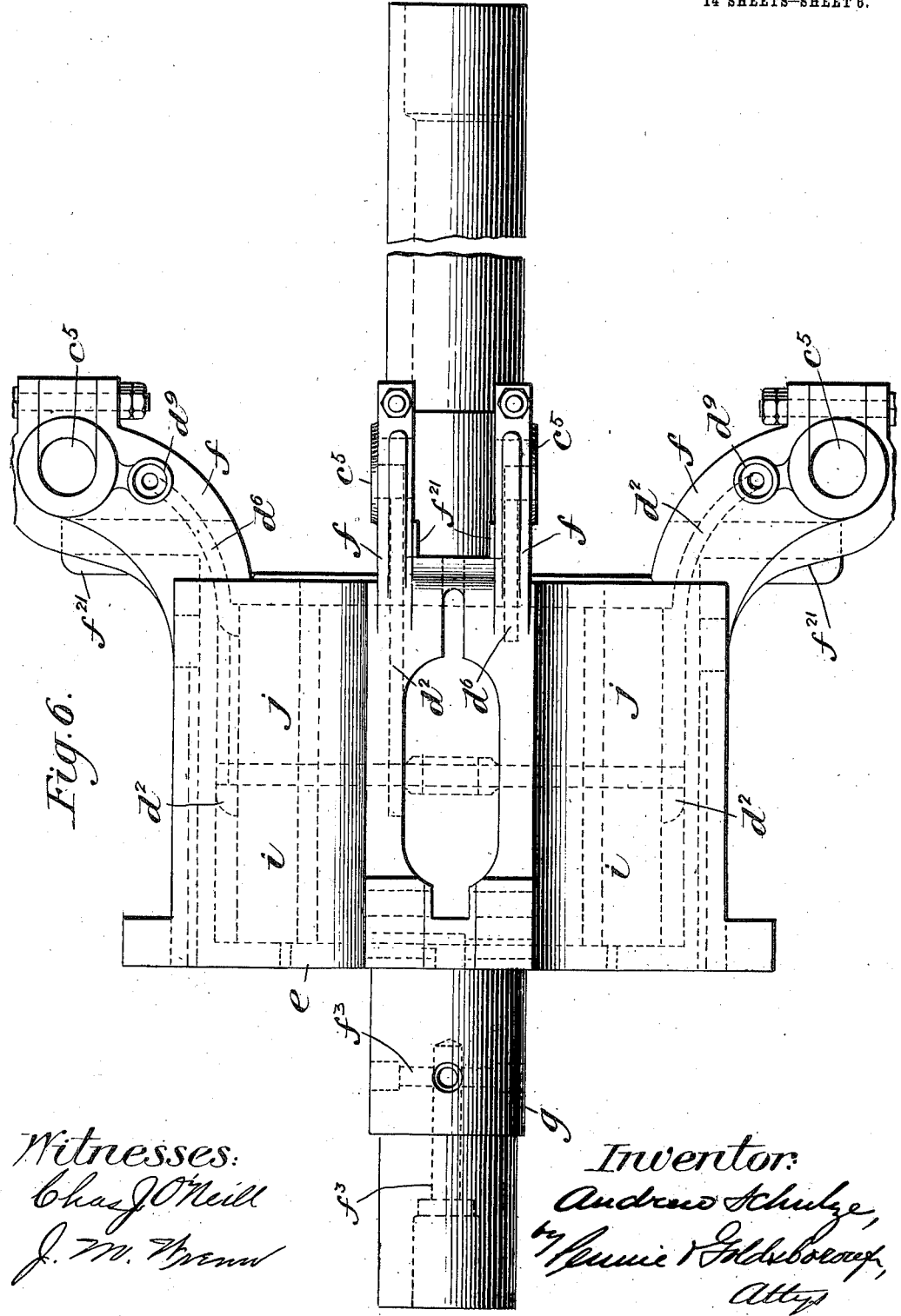

A. SCHULZE.
MANUFACTURE OF RUBBER SHOES, BOOTS, AND THE LIKE.
APPLICATION FILED AUG. 26, 1903. RENEWED NOV. 13, 1908.
1,032,626.
Patented July 16, 1912.
14 SHEETS—SHEET 7.
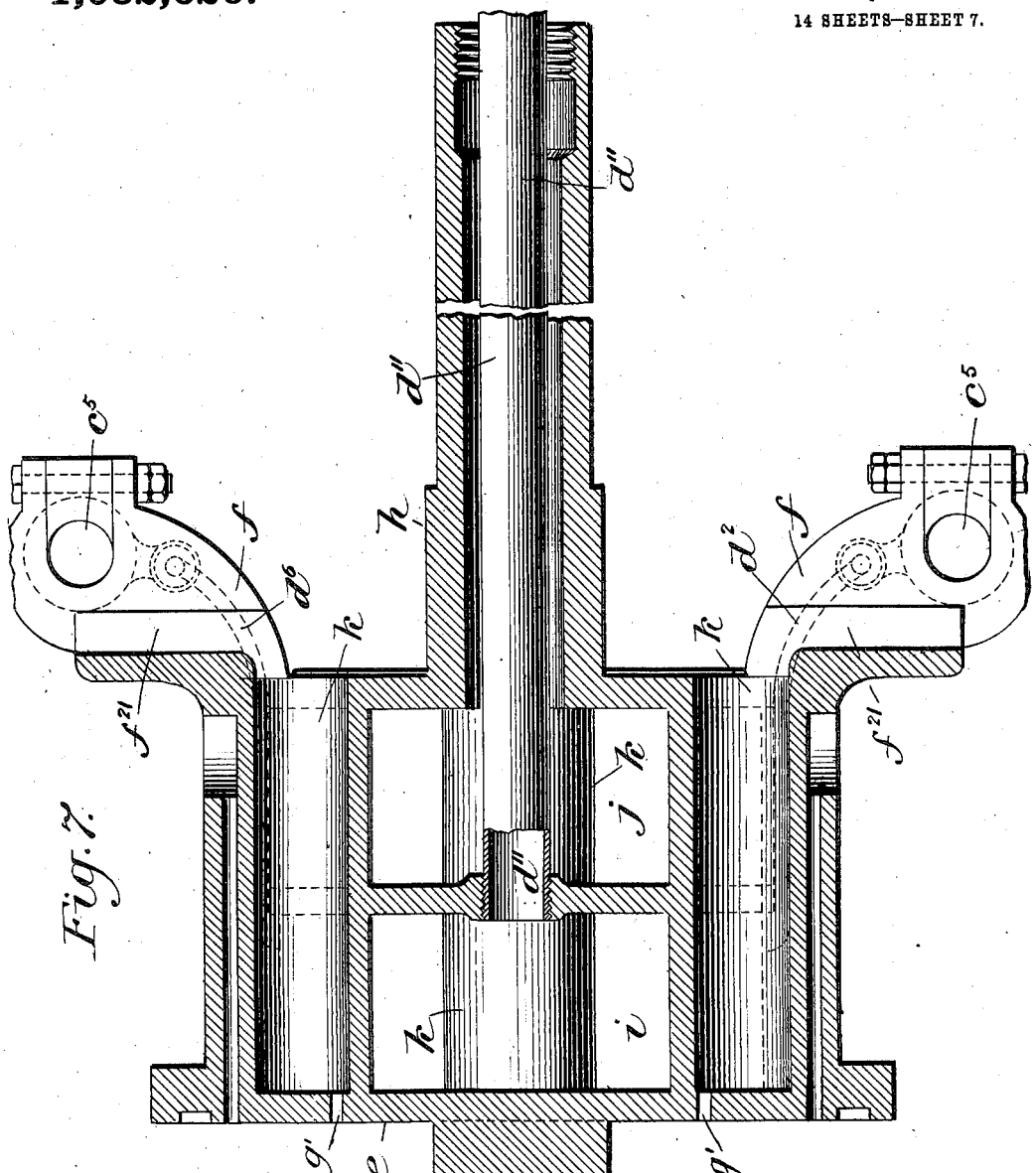

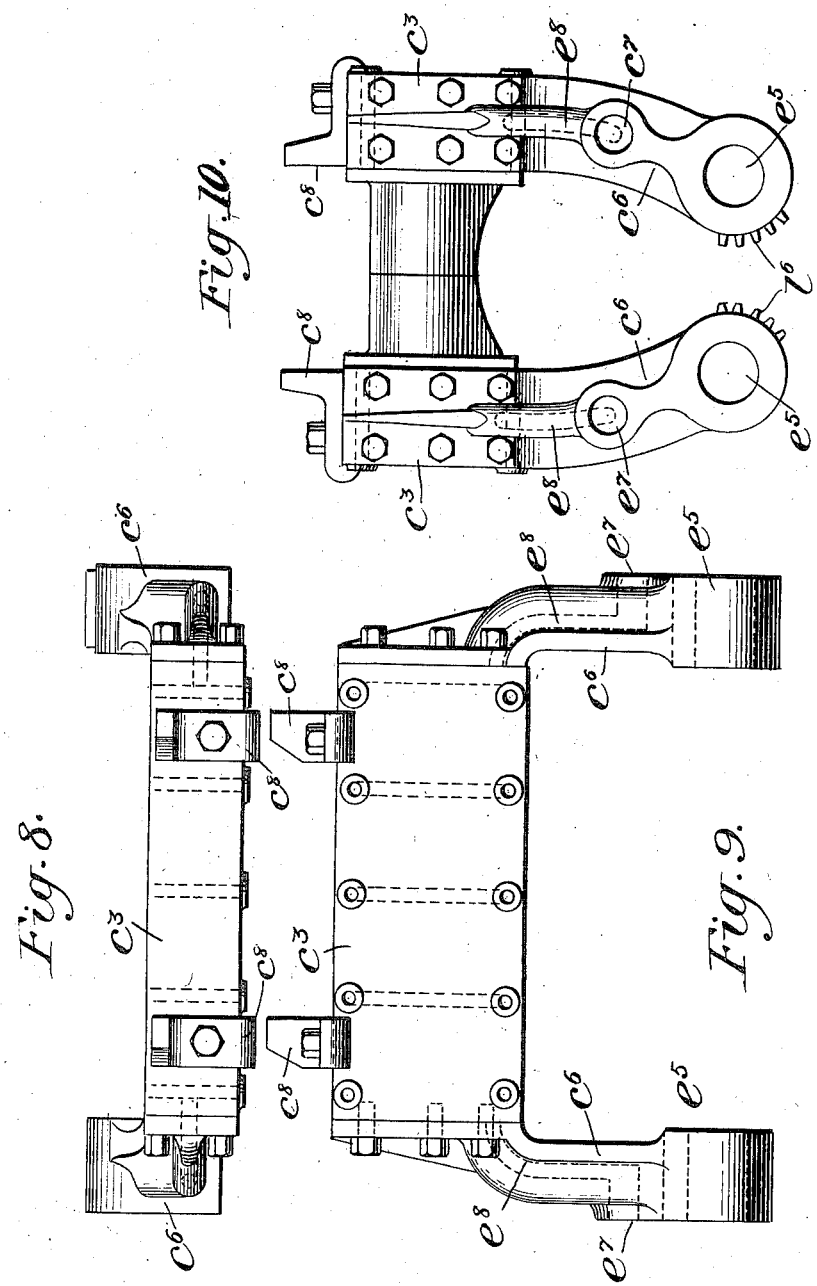

A. SCHULZE.
MANUFACTURE OF RUBBER SHOES, BOOTS, AND THE LIKE.
APPLICATION FILED AUG. 26, 1903. RENEWED NOV. 13, 1908.

1,032,626.

Patented July 16, 1912.

14 SHEETS—SHEET 9.

Witnesses:
Chas. J. O'Neill
J. M. Hrum

Inventor:
Andrew Schulze,
by Pennie & Goldsborough,
Attys

A. SCHULZE.
MANUFACTURE OF RUBBER SHOES, BOOTS, AND THE LIKE.
APPLICATION FILED AUG. 26, 1903. RENEWED NOV. 13, 1908.
1,032,626.
Patented July 16, 1912.
14 SHEETS—SHEET 10.
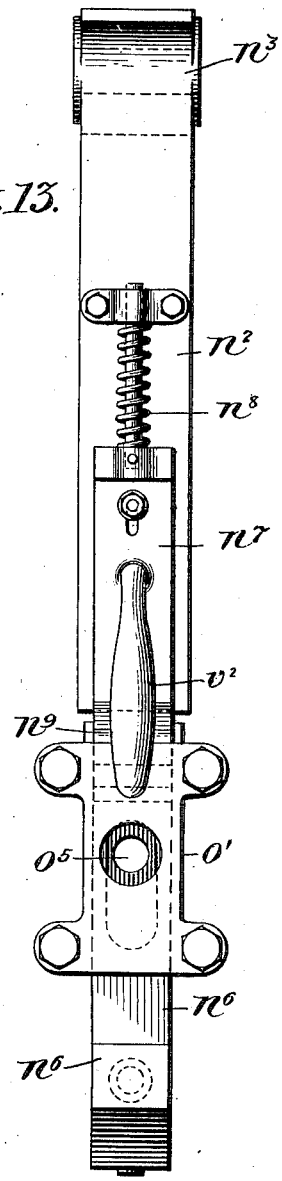
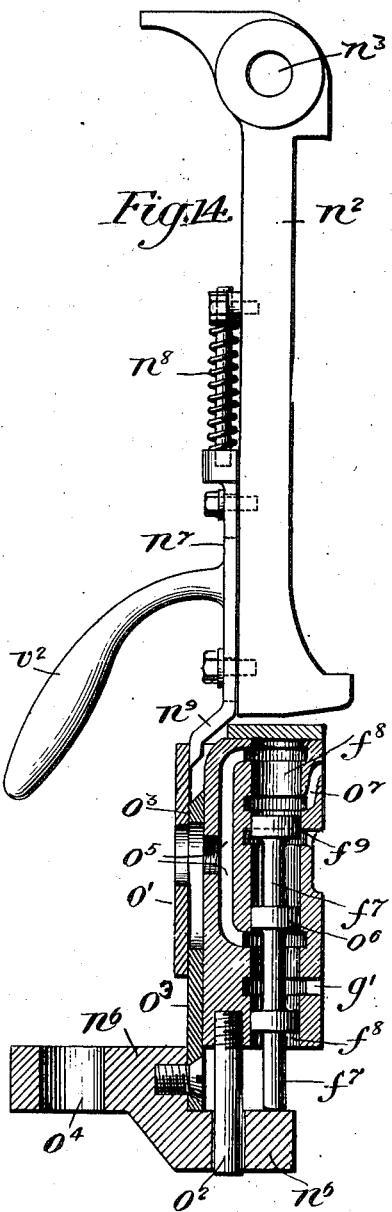

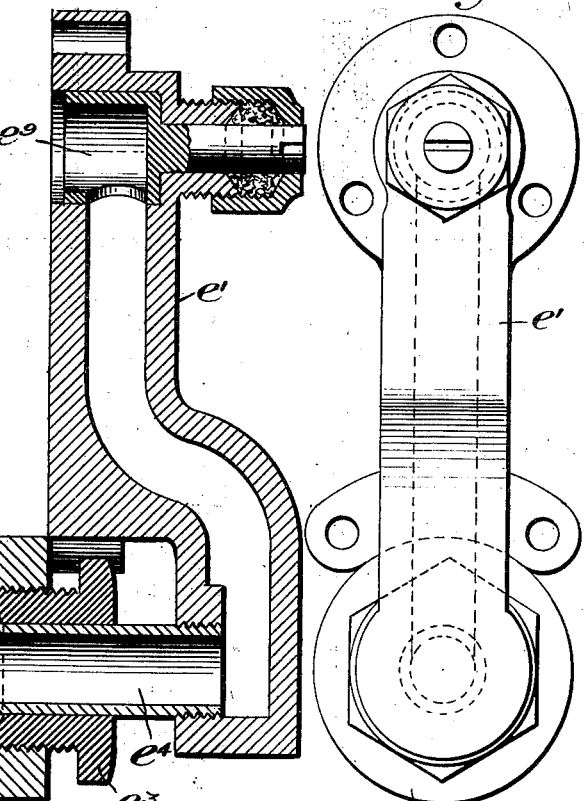
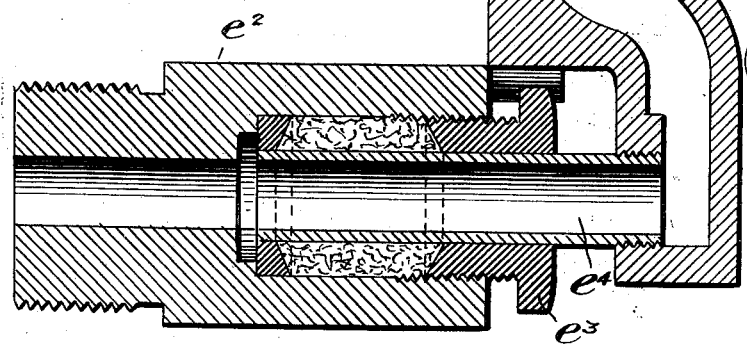
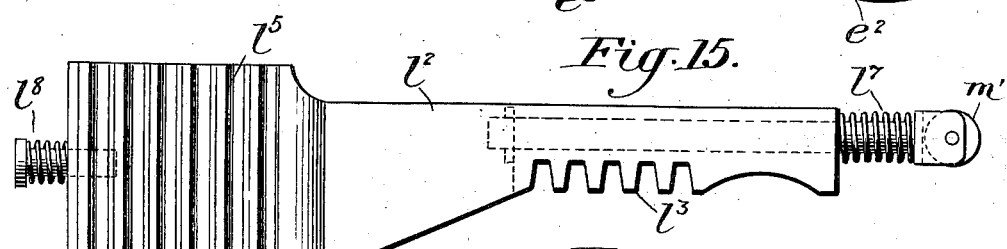
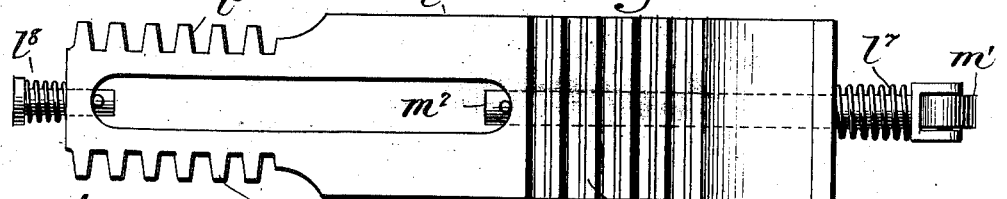

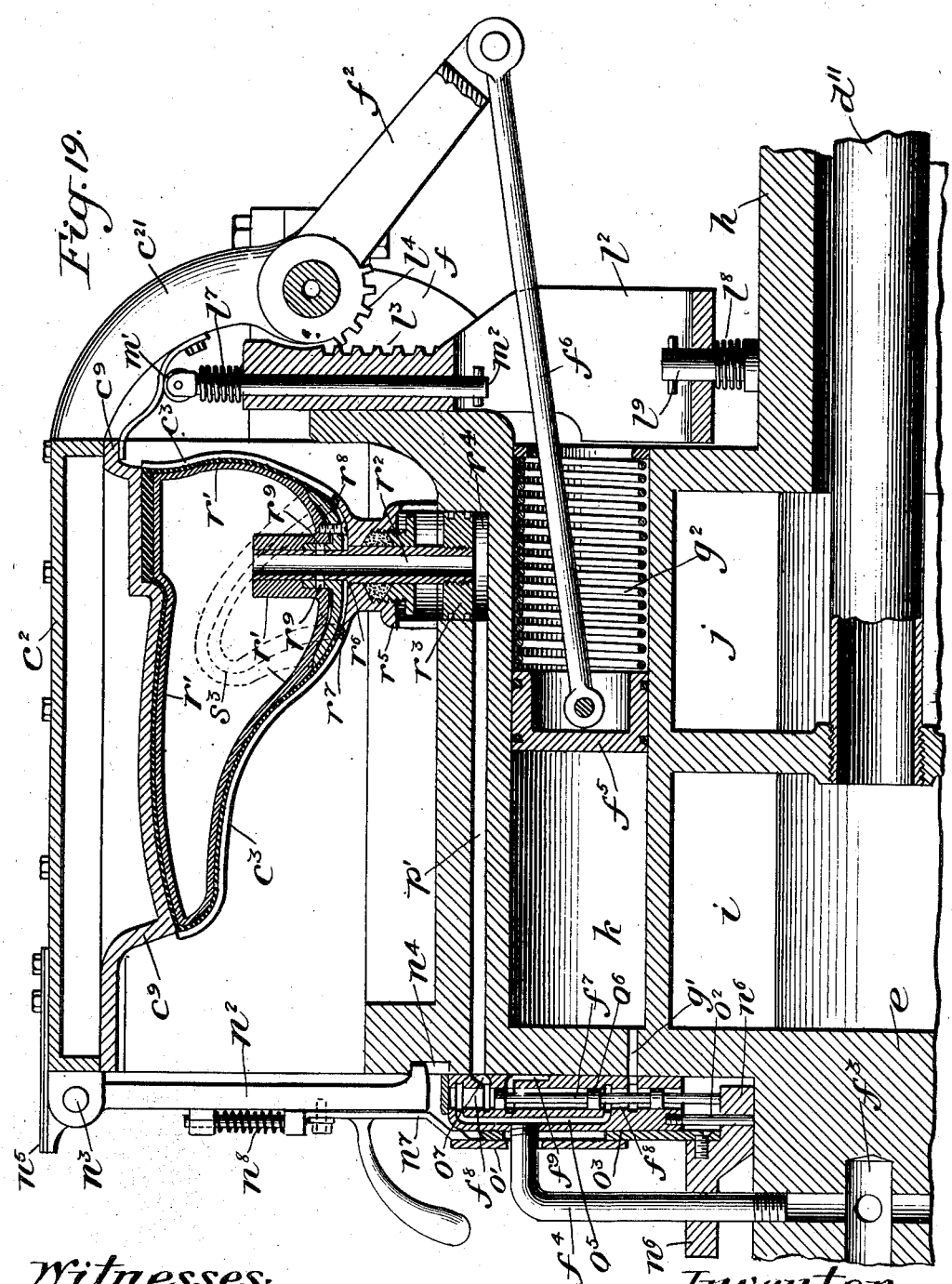

A. SCHULZE.
MANUFACTURE OF RUBBER SHOES, BOOTS, AND THE LIKE.
APPLICATION FILED AUG. 26, 1903. RENEWED NOV. 13, 1908.
1,032,626.
Patented July 16, 1912.
14 SHEETS—SHEET 13.
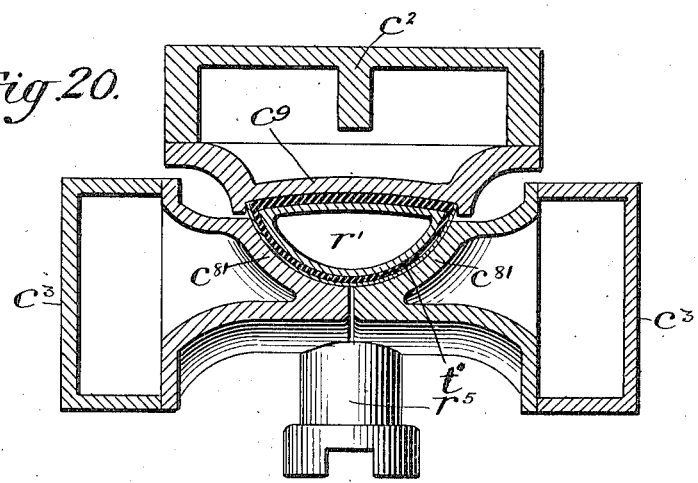
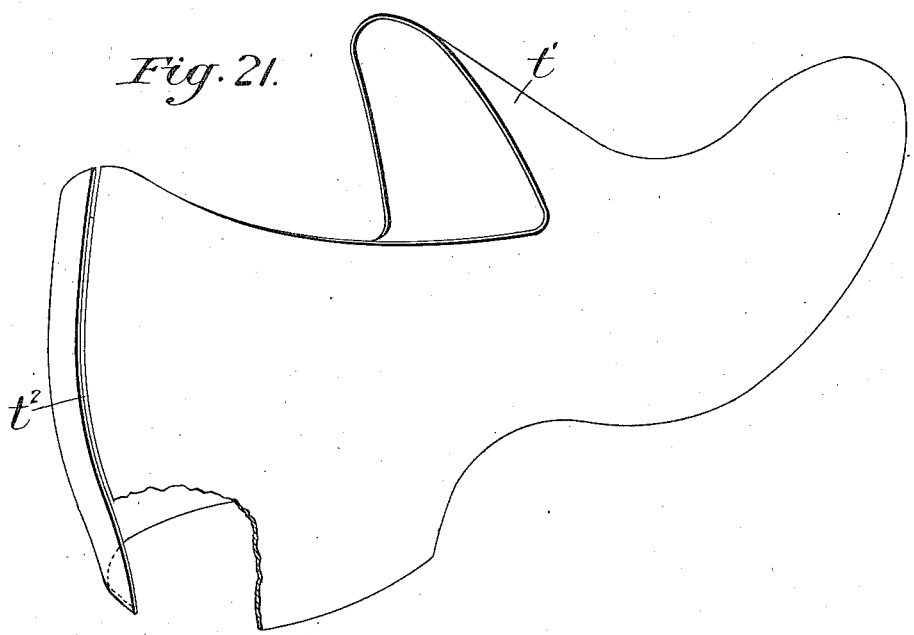

A. SCHULZE.
MANUFACTURE OF RUBBER SHOES, BOOTS, AND THE LIKE.
APPLICATION FILED AUG. 26, 1903. RENEWED NOV. 13, 1908.

1,032,626.

Patented July 16, 1912.
14 SHEETS—SHEET 14.

Witnesses:

Inventor:
Andrew Schulze,
by Pennie & Goldsborough,
Attys

UNITED STATES PATENT OFFICE.

ANDREW SCHULZE, OF WASHINGTON, DISTRICT OF COLUMBIA, ASSIGNOR, BY DIRECT AND MESNE ASSIGNMENTS, TO JOHN C. PENNIE, OF WASHINGTON, DISTRICT OF COLUMBIA.

MANUFACTURE OF RUBBER SHOES, BOOTS, AND THE LIKE.

1,032,626.   Specification of Letters Patent.   Patented July 16, 1912.

Application filed August 26, 1903, Serial No. 170,846. Renewed November 13, 1908. Serial No. 462,520.

*To all whom it may concern:*

Be it known that I, ANDREW SCHULZE, a citizen of the United States, residing at Washington, District of Columbia, have invented certain new and useful Improvements in Manufacture of Rubber Shoes, Boots, and the Like; and I do hereby declare the following to be a full, clear, and exact description of the invention, such as will enable others skilled in the art to which it appertains to make and use the same.

The invention contemplates the manufacture of rubber shoes, boots and the like by machinery at a rate very much faster than has heretofore been possible, and at a greatly reduced cost of production.

As heretofore practised, the manufacture of rubber boots and shoes has been a slow and expensive operation, requiring careful manipulation and watching by skilled workmen, and involving large expenditures for the maintenance and renewal of the apparatus employed.

According to the present invention, finished articles are turned out at intervals of only a few minutes apart, and as the machine operates automatically and at regular intervals, skilled labor is largely dispensed with. Moreover, the machine being practically indestructible, the expense for maintenance and repairs is insignificant, especially when compared with that required by the old methods for renewing lasts, &c.

The machine comprises a traveling frame carrying a plurality of molds. As here shown, this carrier is a rotary one, and four molds are employed. Obviously, however, any sort of an orbitally moving mold-carrying frame might be substituted, and there might be a greater or less number of molds. The carrier is rotated intermittently so as to stop the molds, one after another, in position for the workman to remove the finished articles, and put unfinished ones in their places, before the closing of the molds. In the preferred form of the invention here shown, the carrier is rotated by power, and, as each mold stops in front of the workman, it is automatically opened. But the frame might be rotated by hand or foot, and the duty of opening the molds might also be imposed on the operator, or the automatic closure assisted by him.

The shoes are made up in the rough from prepared stock in the usual way on lasts or forms, which, however, in this instance, are not required to be shaped accurately to the shoes or the molds, but constitute rather supports for the shoes, and serve more as a mere means for adjusting or positioning them in the molds, than as means for shaping the shoes.

The forms should be made of metal, and, though a single one for each mold is sufficient to practically operate the machine, it is advisable to provide a greater number in order that the periods of intermission in the rotation of the mold-carrying frame need not be prolonged.

The molds consist of three parts, two sides and a top, and their interiors are accurately formed to give the desired shape to the shoes. They are heated, in the manner hereinafter described, in order to vulcanize the rubber, and the inner surfaces should be polished so as to give the desired finish to the shoes. When the forms carrying the unfinished shoes are properly positioned, and the molds are closed around them, it is not intended that the rubber shall be pressed inwardly against the forms, or be squeezed between the unyielding metal surfaces of the molds and forms. Instead, air or other elastic fluid is introduced into the interior of the shoes under sufficient tension to press the rubber, and particularly the seams and edges of the shoes, outwardly against the interior walls of the molds, thus providing an elastic compression for all parts of the shoes, and securing the incidental advantages of uniform vulcanization of the rubber, and the employment of lasts or forms of thin, light, inexpensive construction.

The air is admitted and cut off automatically at the closing and opening of the molds, and the molds themselves are kept constantly at the required temperature to effect the rapid vulcanization of the shoes by steam, or other heating medium, that is admitted into the hollow walls of the several parts of the molds.

Figure 2:
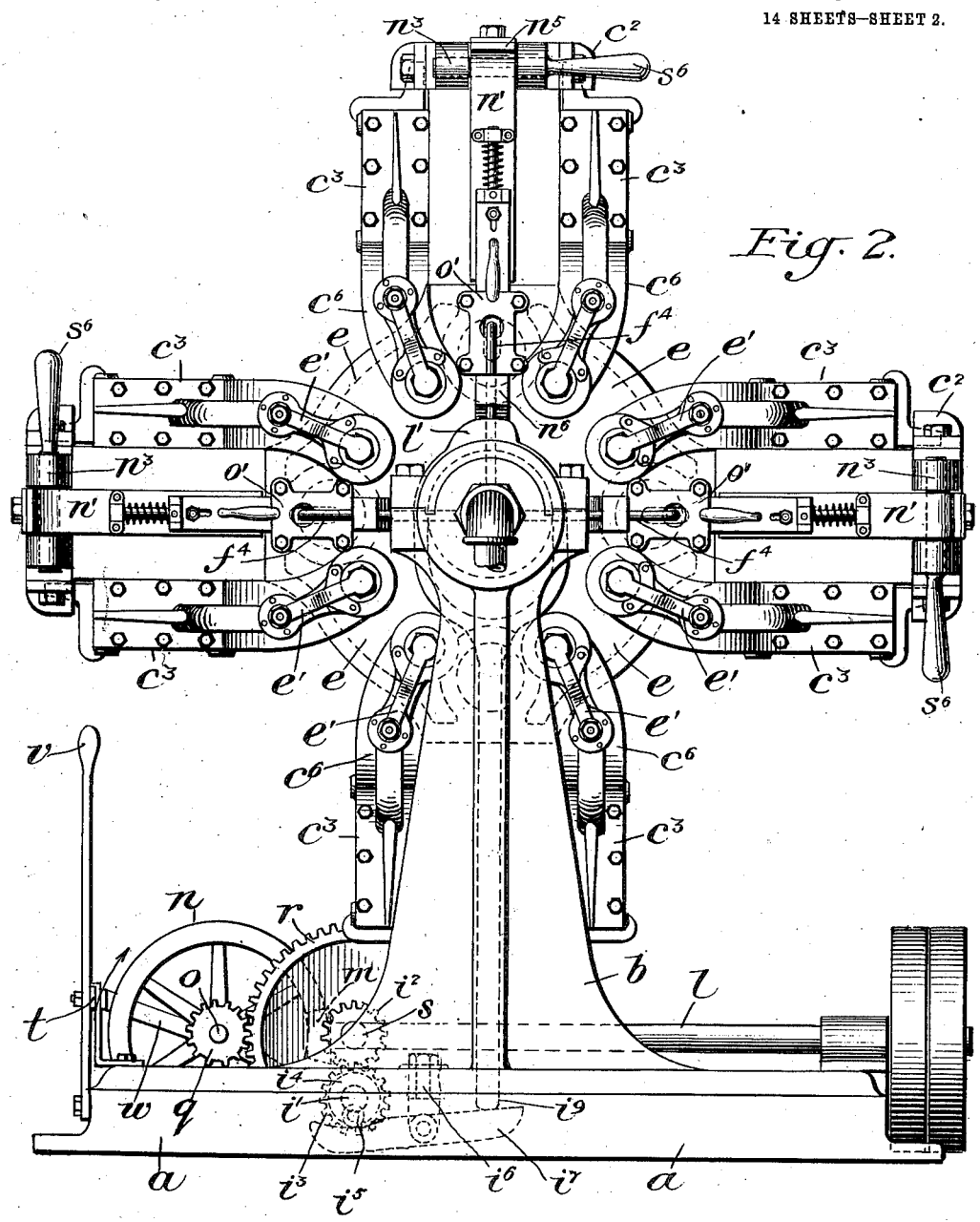
Figure 11:
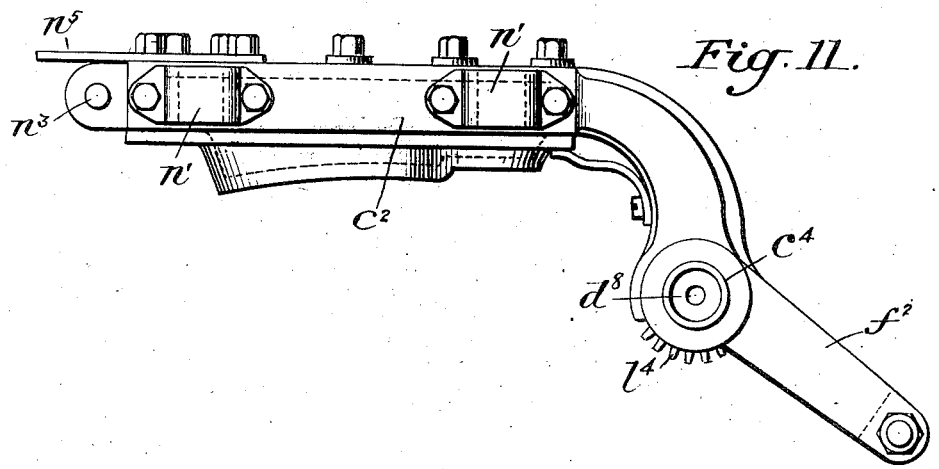
Figure 12:
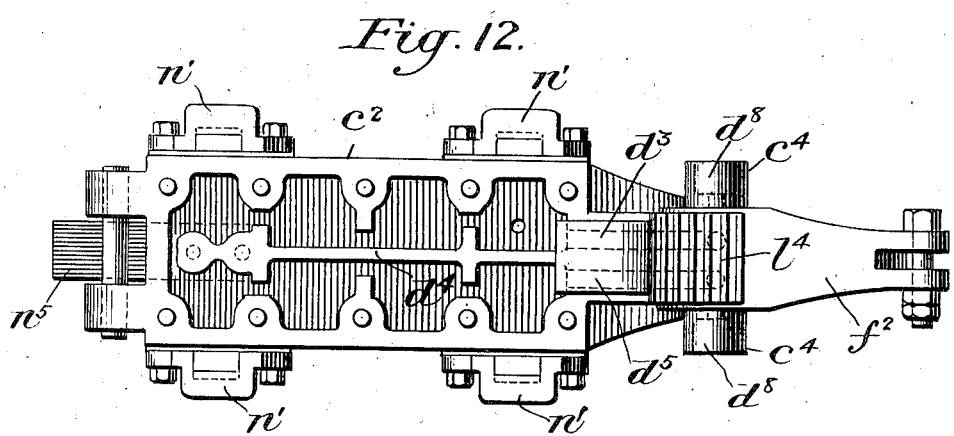
Figure 22:
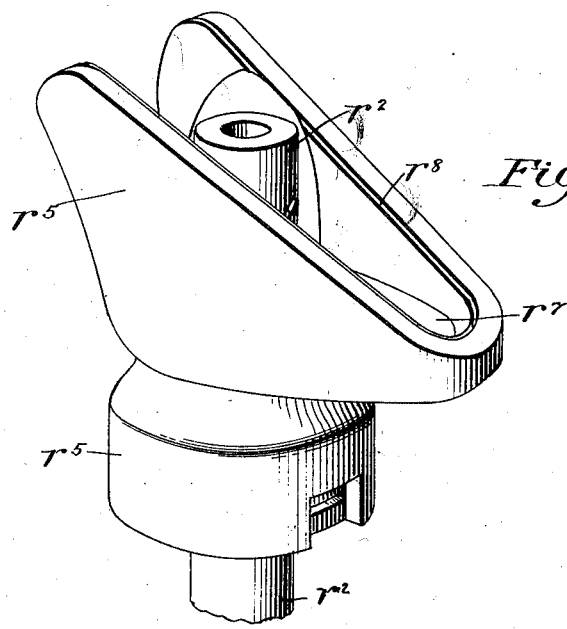
Figure 23:
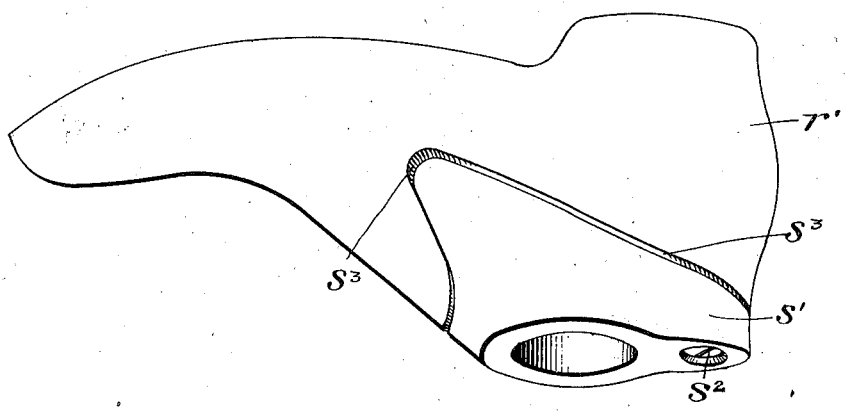

The present embodiment of the invention is illustrated in the accompanying drawings, forming part of this specification, and in which;

Figure 1 is a side elevation of the complete machine; Fig. 2 is a front end view of the same; Fig. 3 is a section on the line 3—3, Fig. 1. Fig. 4 is a detail of the mechanism for giving the mold carrier its intermittent rotation; Fig. 5 is a front end elevation of the mold carrier detached; Figs. 6 and 7 are, respectively, a side view of the carrier, and a central longitudinal section of the same; Fig. 8 is a top plan view of one of the sides of one of the molds; Figs. 9 and 10 are, respectively, side and end views of the same; Figs. 11 and 12 are side and bottom plan views of the top of one mold; Fig. 13 is a front elevation of the latch for locking the molds and holding them closed during the vulcanizing process; Fig. 14 shows the same in side view with part of the latch-operating mechanism and the mechanism for controlling the admission and exhaust of air to and from the interior of the shoes, the latter being in section; Figs. 15 and 16 are face and edge views of the rack bar, by means of which the sides of the molds are caused to open laterally when the tops are lifted; Figs. 17 and 18 are, respectively, an end view and a longitudinal section of one of the conduits, which admits steam into the folding sides of the molds; Fig. 19 is a central longitudinal section of one of the molds, showing also the spring and pneumatic cylinder and piston for operating the tops of the molds; Fig. 20 is a cross section of the mold when closed, showing also a last and shoe in position; Fig. 21 is a perspective of a shield employed as an adjunct to the machine to prevent the formation of fins or ribs on the shoes; Fig. 22 is a detached perspective of the union or coupling around which the mold sides fit, and which forms a support for the last; and Fig. 23 is a separate view in perspective of the last, the object being more particularly to show the means for admitting the air between the exterior of the last and the inside of the shoe.

Referring to these views, $a$ denotes the base of the machine, which, as here shown, is rectangular, but may be of any convenient form, height and construction. At opposite ends of this frame, standards $b$ are erected, and in bearings $d$ at the upper end of these standards, the mold carrier $e$ is journaled. The construction of this carrier will be best understood from Figs. 5, 6 and 7. It has a cylindrical body provided at its rear end with four pairs of outwardly projecting arms $f$ at diametrically opposite points. These arms constitute the supports for and carry the bearings of the tops of the molds, as will be more fully described later on, and at its ends the carrier body has journals $g$, $h$, by means of which it is rotatably mounted in the bearings on the standards, already described. The body of the carrier is hollow and formed into chambers $i$, $j$, the former of which receives steam from the source of supply, and distributes it to the hollow walls of the molds, and into the other of which the steam passes after having traversed the interior of the mold walls, the journal $h$ of the carrier being tubular and communicating with the chamber $j$, as shown in Fig. 7, so as to carry off the exhaust steam. The carrier body has also formed lengthwise in it, at points corresponding to the position of the molds, four pneumatic cylinders $k$, forming part of the mechanism for opening and closing the molds.

I will now describe the means for rotating the mold carrier, and afterward will explain the construction, mounting and manner of heating and operating the molds themselves.

It has already been stated that the carrier is revolved with a step by step or intermittent motion, so as to cause it to pause as each mold comes opposite the position of the operator. As here shown, it stops four times in each revolution, there being four molds. But there might be any number of molds, and the carrier operating mechanism would be correspondingly modified so as to stop each mold before the operator's stand long enough for him to open it and remove the completed shoe, and put in a new one to be vulcanized.

The power to rotate the mold carrier is taken from a shaft $l$, running across the base of the machine at its rear end. This shaft carries a pinion $m$, which meshes with a bevel wheel $n$ on one end of a short shaft $o$, journaled in bracket bearings $p$ at one side of the base, at the rear. Near the other end, the shaft $o$ carries a spur pinion $q$, which meshes with a gear $r$ on the rear end of another short shaft $s$, having one bearing in a bracket on the base, and another in the rear standard.

The bevel wheel $n$ is preferably loose on its shaft and adapted to be connected to and disconnected therefrom by any sort of a clutch that may be controlled by a rod $t$, sliding in brackets $u$, and having at its rear end, near the operator's stand, a hand lever $v$, and at its other end an arm $w$ that engages the clutch.

The mold carrier is driven from the wheel $r$ and as it has the intermittent motion already explained, the wheel also has a corresponding intermittent rotation. This is effected by cutting away the teeth of the gear $r$ for nearly one quarter of its periphery, as shown at $x$ in Fig. 4, and forming a single large tooth $y$ on the pinion, in addition to the ordinary teeth. When the gear $r$ rotates to the point where the pinion reaches this blank portion, the pinion continuing to rotate produces no motion of the gear, except such very slow rotation, for a short period, as is obtained from the engagement of the single tooth $y$ with certain notches $a'$, formed in the wheel $r$ where its gear teeth are cut away.

The wheel $r$ is connected by a pitman $a^2$ and wrist-pin $a^3$ to an arm $a^4$, which oscillates freely on the shaft $h$ of the mold carrier, adjacent to a disk $a^6$ that is fixed on the carrier shaft and is provided with peripheral notches $a^7$ corresponding in number and position with the molds. The arm $a^4$ carries a pawl $a^5$, which is constantly pressed by a spring $a^8$ to engage the notches of the disk, and as the gear $r$ makes a complete rotation from the position indicated in Fig. 4, it swings the arm $a^4$ up and down, thereby producing a quarter revolution of the disk and rotating the carrier so as to bring a new mold to the position of the operator's stand.

During the time when the cut-away portion of the gear $r$ is passing the pinion $q$, and during that part of the rotation of the gear which raises the pawl-carrying arm to take into a new notch in the disk $a^6$, the mold carrier is stationary, and it is desirable that it should be locked in fixed position, for at this time the operator is engaged in removing a completed shoe and adjusting a new one in the mold. To form this lock, I pivot on a stud $a^9$, projecting from the rear standard $b$, a bell crank $b'$ having a dog $b^2$ at its outer end to engage the notches of the disk. A spring $b^3$ engages the other end $b^4$ of the bell crank and normally presses the dog into the notches, and in order to automatically release the lock, the end $b^4$ of the bell crank is connected to the pitman $a^2$ by a rod $b^5$ passing loosely through the end of the crank and having a stirrup $b^7$ at one end, through which the pitman is free to slide. The spring $b^3$ encircles the rod $b^5$, and reacts between the bell crank and the pitman through the intermediacy of the stirrup, and holds the dog $b^2$ into one of the notches of the disk until the pawl-carrying arm $a^4$ is about to move downward to rotate the disk. At this time, the lateral movement of the pitman, caused by the wrist pin crossing the dead center, pulls on the rod $b^5$ and releases the dog. It is also desirable that the pawl should be of the positive locking kind, and in order to release it just before its carrying arm starts upward to engage a new notch, I provide the bell crank $b'$ with an arm $b^6$ projecting in the opposite direction and having its outer end standing normally in the path of the pawl $a^5$, as shown in Fig. 4. When the pitman moves to the left, (looking at Fig. 4), it operates the bell crank so as to cause the dog $b^2$ to engage the notched disk of the mold carrier, and causes the arm $b^6$ of the crank to push the pawl $a^5$ outward against the spring $a^8$, so as to free the pawl from its notch and set it for engagement with another notch when the arm $a^4$ reaches its upper position. It will thus be seen that the movements of the mold carrier are derived directly from and controlled by the wheel $r$, and as this wheel, as already explained, is intermittently driven from a constantly rotating pinion, it is desirable to provide a brake to prevent its momentum from carrying it too far, especially at the time when the single tooth $y$ of the pinion $q$ is operating on it. This is conveniently formed by a spring $b^8$ secured to the machine base and having its free end bent as shown in Fig. 4, and engaging notches $c'$ in the rim of the wheel.

The mold carrier is stationary from the time the wrist pin $a^3$ reaches the position shown in Fig. 4, until the wheel $r$ makes half a revolution. The wheel itself, however, is simply slowed down at this time, while the oscillating pawl-carrying arm is being returned to operative position, and this slow motion is provided by the single tooth $y$ of the pinion $q$, and the notches $a'$ of the gear. While the gear and pinion are engaged in this way, the pitman is carried from its lower position, (see Fig. 4), into the upper quadrant described by the wrist pin, at which time the pawl $a^5$ is almost ready to engage a new notch. About the time this engagement takes place the gear $r$ resumes its normal rate, and the pawl-carrying arm is swung downward much faster and at the same speed as the rotating carrier.

The molds for shaping and vulcanizing the shoes are formed in sections and are opened and closed automatically. As here shown, they are made in three parts, viz., a top $c^2$ and two sides $c^3$, each formed in the shape of a rectangular box with hollow interiors forming steam heating chambers. The top $c^2$ of each mold is pivoted by trunnions $c^4$ in bearings $c^5$ in the arms $f$, projecting radially from the rear end of the mold carrier. The sides $c^3$ are provided with arms $c^6$ at each end, by means of which they are pivoted to the ends of the mold carrier at points indicated at $c^7$ in Fig. 5. Mounted in this manner, the molds open and close by the three parts above described, folding toward and away from each other, the top swinging up and down in a vertical plane lengthwise the carrier axis on its cross bearings $c^5$, and the sides swinging in and out in a transverse plane on its pivots at the ends of the carrier body, so that, when the three parts come together, they form a complete inclosure for one shoe. It is to be understood, of course, that each part $c^2$, $c^3$, of the molds has an interior formation, or mold proper, that is shaped to conform to the exterior surface of the shoes, each side $c^3$, for example, carrying a mold $c^{81}$, and the top carrying a plate-like mold $c^9$, which is shaped to conform to the sole of the shoe.

Steam or other medium to heat the molds to vulcanizing temperature, is taken from any suitable supply into the chamber $i$ of the mold carrier through the pipes $d'$, $d''$, the latter passing through the hollow trunnion $h$ of the carrier body. From this chamber it passses into the tops of the molds through ducts $d^2$ into one of the trunnions $c^4$. Thence it passes through the channel $d^3$ into the hollow interior of the top on one side of the division plate $d^4$, whence it goes around the forward end of the plate, back through the other half of the cover and the duct $d^5$, out through the other trunnion $c^4$. It is conducted thence to the chamber $j$ of the mold carrier, through the passage $d^6$, and escapes through the hollow trunnion $h$ of the carrier into the pipes $d^7$ to the atmosphere. An ordinary steam trap $d^8$ is preferably included in the piping $d'$, $d^7$, to trap the condensed steam, and in order to connect the trunnions $c^4$ of the mold tops with the ducts $d^2$, $d^6$, outside tubular connections $d^{71}$, $d^{71}$ are employed, substantially like those shown in Figs. 17 and 18. These connections are fitted into circular recesses $d^8$ in the trunnions, and their opposite ends are connected by steam tight joints with circular bosses $d^9$ in the arms $f$, into which bosses the ducts $d^2$, $d^6$ open. In this way, provision is made for a constant circulation of steam through the mold tops without interfering with their rising and falling movements, or the rotation of the mold carrier.

Steam to heat the mold sides is also taken from the chamber $i$ in the carrier body through hollow connections $e'$, Figs. 17 and 18. Unions $e^2$ are tapped into the holes $c^7$ in the front wall of the carrier body, and the connections are united to these unions by glands $e^3$ and pipes $e^4$, in such a way that the connections $e'$ may swing with the sides of the molds as they open and close. The unions $e^2$ also form trunnions which pass through the bearings $e^5$ in the arms $c^6$ of the sides, so that the mold sides are journaled or pivoted on these unions, and the pipes $e^4$ and the connections $e'$ turn in the unions with the swinging movements of the arms $c^6$, the upper ends of the connections being secured to hollow bosses $e^7$, on the arms, some little distance above their pivots, into which bosses the ducts $e^8$ open that conduct the steam into and out of the hollow interiors of the sides. At their outer ends, where they connect with the bosses $e^7$, the connections are provided with adjustable valves $e^9$ to control the passage of steam, and it will, of course, be understood that the steam after passing into the mold sides, circulates through them and passes out at the other end through similar connections and unions at the rear end of the carrier body, into the same chamber $j$ which receives the steam from the mold tops.

As before stated, the tops of the molds are pivoted at the rear end of the carrier body in bearings in the arms $f$, and the sides of the molds are pivoted by their arms $c^6$ at both ends of the carrier. The tops swing on their pivots $c^4$ upward and away from the operator in opening, and the sides swing laterally on their pivots $e^5$ so as to fold sidewise. The simultaneous action of these sides and top, so as to open and close the molds, is effected by the following means: $f'$ is a pipe taking compressed air from any suitable source, and delivering it through passages $f^3$ and pipes $f^4$ into the cylinders $k$, already described, formed on the inside of the carrier body parallel with the axis thereof. The tops of the molds are provided with rearwardly extending arms $f^2$, and in each of the cylinders $k$ there works a piston $f^5$, which is connected to the arm $f^2$ by a rod $f^6$, so that, as the piston works to and fro by the admission and exhaust of air into and from the cylinder, the top of the mold is raised and lowered. Compressed air is admitted to and released from each cylinder by a valve $f^7$ working in a chamber $f^8$, which communicates with the cylinder through a passage $g'$. During one complete rotation of the carrier, the air pressure is on in the cylinder and the molds are held closed, the sides being locked to the top by pins $c^8$, which enter keepers $n'$ on the side edges of the tops, and the tops being held closed by a latch $n^2$, which is pivoted at $n^3$ to the front edge of the top and catches at its other end under a shoulder $n^4$ on the mold carrier, as shown in Fig. 19, a spring $n^5$ on the mold top holding the latch normally in position to automatically lock the top down as soon as it is closed.

The sides of each mold are operated with the rising and falling of the top through the intermediacy of a rack $l^2$, which fits against the rear end of the mold carrier and slides between lugs $f^{21}$. On their rear faces the slides are provided with gear teeth $l^3$ which mesh with the corresponding teeth $l^4$ on the hubs of the trunnions $c^4$ of the mold tops, so that as the tops are raised and lowered, the racks $l^2$ are also raised and lowered. On their side edges the racks are provided with other teeth $l^5$, and these mesh with teeth $l^6$ formed on the hubs of the rear arms $e^6$ of the sides of the molds. From this arrangement and connection between the sides and top of the molds, it results that whenever the top of a mold is unlocked and lifted, the two sides are positively operated and swung outwardly, so that the whole interior of the mold is opened up to permit the operator to remove the completed shoe and put an unfinished one in its place.

As before described, each mold is closed by the air pressure in the cylinder $k$ driving the piston $f^5$ rearward, and as the weight and momentum of the parts is considerable, I employ buffer springs $l^7$, $l^8$, located at opposite ends of the rack. The spring $l^7$ is stronger than the spring $l^8$ and is coiled around a pin $m^2$ having a limited movement in the rack, and the spring $l^8$ is coiled around a similar pin $l^9$. These springs, especially the lower one, cushion the blow of the mold sections and prevent them from slamming and jarring the machine. The spring $l^7$ also assists the main spring $g^2$ in opening the mold top, and after it has expanded to practically its limit, the other spring serves to start the rack upward, so that its teeth will engage those on the hub of the arm $c^{21}$, it being understood that these teeth pass out of gear when the mold closes, in order to permit the sides to close before the top and to have the top open before the sides. This movement of the sides and top is necessary in order to effect the locking of the mold parts together, as the sides must be fully closed before the keepers $n'$ on the mold top can come down over the pins $c^8$ on the sides.

The latch $n^2$ is secured in its locked position by a sliding detent $n^7$, which is mounted on the latch as shown in Figs. 13 and 14, and is operated by a spring $n^8$ so that its lower end $n^9$ automatically catches behind a plate $o'$, by means of which the valve chamber is secured to the mold carrier and the upper edge of which forms a locking shoulder for the detent.

The detent is unlocked when the mold reaches the vertical position shown in Fig. 2 by the following means: The shaft $s$, of the carrier operating wheel $r$, is connected by gears $i^2$, $i^3$ to a shaft $i'$, extending forward to a point just inside of the front standard $b$. At this end the shaft carries a disk $i^4$ having an eccentric pin or roller $i^5$, and there is pivoted to a stud $i^6$ in the machine base, a lever $i^7$, one end of which lever extends under a rod $i^9$ sliding vertically in keepers on the rear side of the standard. The lever stands in the path of the roller $i^5$ on the disk, and the upper end of the rod $i^9$ surrounds the carrier shaft and has a cam $l'$ on it, which stands in the path described by the block $n^6$. As before explained, the wheel $r$ makes one complete revolution for every one-fourth of a revolution of the mold carrier, and of course the shaft $i'$ makes one revolution during the same time. This actuates the lever $i^7$ and sliding cam rod $i^9$ four times during every revolution of the mold carrier, viz., once for each mold, and the periods are so timed by the gearing already described, that the cam $l'$ is actuated immediately after the arrival of each mold at the vertical position shown in Fig. 2. The actuation of this cam raises the block $n^6$ which is mounted to slide up and down on a guide pin $o^2$. This block stands in position to be struck by the cam $l'$, and has secured to it a plate $o^3$ which slides between the keeper plate $o'$ and the valve casing. The block is also guided by the pipe $f^4$ which passes through a perforation $o^4$. The upper edge of the plate $o^3$ is beveled outwardly and downwardly and the lower edge of the detent $n^7$ is beveled upwardly and inwardly, and when the block is lifted it strikes the detent and releases it from behind its shoulder, and the beveled surfaces coming together, throw the latch $n^2$ outwardly so as to release its lower end from under the shoulder $n^4$. The cam $l'$ also actuates the valve $f^7$, and for this purpose the inner end of the block $n^6$ extends under the end of and supports the valve, so that the upward movement of the block operates the valve to exhaust the air pressure in the cylinder $k$ immediately before it unlocks the detent $n^7$ to release the mold top. The escape of the air from the cylinder then permits the spring $g^2$ to open the top, as already explained. The valve chamber communicates freely with the pipe $f^4$ through passage $o^5$, and the valve stem has a central piston $o^6$ which divides the chamber into two parts, in the lower of which is the port $g'$ leading to the cylinder $k$, and in the upper of which is the port $o^7$ leading to the interior of the mold. When the valve is raised by the cam $l'$ and block $n^6$, the port $g'$ is thrown into communication with the atmosphere through the open lower end of the valve casing, and the air in the cylinders exhausts freely, but when the block falls, the air pressure at the other and closed end of the casing forces down the valve, closing the lower end and admitting air into the cylinder. The air to expand the shoe in the mold is also admitted through the valve chamber, and its admission and exhaust are controlled by the same valve. To this end the carrier body is provided with a passage $p'$, one for each mold, communicating by a port $o^7$ with the upper chamber in the valve casing. This chamber is closed above the port and open to the atmosphere below the port through the passage $f^9$, and the raising of the valve $f^7$ establishes communication between the ports $o^7$ and $f^9$, and permits the air in the shoe to exhaust freely to the atmosphere. This occurs immediately before the air has been exhausted from the cylinder, and the lowering of the valve closes the exhaust port $f^9$ and opens the port $o^7$ leading to the mold through the passage $p'$.

The last $r'$ is shown detached in Fig. 23, and in position in the mold in Fig. 19. It is of metal and is imperforate and preferably made hollow for lightness, but may be solid if desired. It is supported in an inverted position in the mold, and a short pipe $r^2$ having a piston $r^3$, which works in a cylindrical chamber $r^4$ in the outer wall of the mold carrier, projects upward into the last and forms a peg on which it is adjusted and by which it is supported when the mold is open. The chamber communicates with the passage $p'$ below the piston, and over the chamber and forming practically the top thereof, is set a union $r^5$, through the top of which the pipe works air-tight. The chamber is open to the atmosphere above the piston, and the upper edge of the union fits accurately around the edge of the mold opening when the two sides are closed.

The shoe is made up on the last in the usual manner, and the last is then adjusted in position over the upper end of the pipe, which has a shoulder $r^6$. Air being admitted by the valve $f^7$ into the chamber $r^4$ through passage $p'$, moves the pipe upward and the shoulder $r^6$ strikes the last and forces it up with its sole against the correspondingly shaped mold top, thereby pressing the sole of the shoe with an elastic pressure against the inner surface of the top, instead of squeezing it between surfaces to which there is no yield.

The upper edge of the union $r^5$ is formed with a flange $r^7$, which is extended laterally to slightly overlap the ankle margin of the shoe. The shape of this flange varies with the style and shape of the shoe, the shape shown herein being adapted to what is known as a storm shoe, where the opening is shaped as shown by the dotted line in Fig. 19. Preferably, the upper surface of the flange has one or more grooves $r^8$ around its edge, into which the margin of the shoe is pressed so as to form a head on it to straighten that part of the shoe.

The last being imperforate, the air entering it has no effect to press the shoe outward against the inner walls of the mold. For this purpose air is introduced between the outer surface of the last and the inner surface of the shoe, and openings $r^9$ are provided in the sides of the pipe $r^2$ near its upper end, through which air passing up the pipe finds its way into the shoe and presses the neck or ankle margin down against the flange of the union, and across the joint between the union and the mold opening, so as to tightly close the latter and press the rubber into the groove $r^8$. The air also, being under considerable pressure, finds its way all around the last except the sole, and presses all parts of the shoe upper against the interior walls of the mold.

It is desirable to provide means to prevent wrinkling of the ankle margin of the shoe, and to insure that it lies down flat on the flange of the union and over the joint between the edge of this flange and the mold opening. For this purpose I employ a cap $s'$, that is secured to the last and is shaped to conform to the joint between the union flange $r^7$ and the edge of the opening in the mold, through which the pipe projects and whose edge makes as close a fit as possible with the edge of the flange. The cap overlaps this joint as shown in Fig. 19, and when the last is inverted and adjusted over the end of the pipe, it presses the margin of the shoe down so as to flatten it out and prevent the formation of crimps or wrinkles. The cap is secured to the last loosely so as to be movable thereon. As here shown, it is fastened by a screw $s^2$ of sufficient length to permit the cap to fall away from the last, when the the latter is inverted, just enough to open a space $s^3$ between its upper surface and the last, for the free admission of air from the pipe $r^2$ between the last and the shoe, and also to press the shoe margin down with its own weight independently of the last or the air pressure. The formation of this opening is preliminary to the admission of air into the pipe, and opens up communication between the openings $r^9$ and the inside of the shoe through the space shown in Fig. 19, between the ankle end of the last and the upper side of the cap. It constitutes a preliminary and momentary expedient for the purpose above described. As soon as the air pressure is turned on, the rise of the piston $r^3$ and pipe $r^2$ causes the shoulder $r^6$ to strike the cap $s'$ and press the last up with its sole against the plate of the mold top. The cap then falls away from the last of its own weight, and thus opens the space $s^3$ and permits the air to pass between the cap and the last and enter the shoe on the outside of the last, thereby expanding it against the inner walls of the mold.

The sectional view, Fig. 20, illustrates the way in which the three parts of the mold come together. The pressure of the rubber into the joints formed at the meeting edges of the sections $c^2$, $c^3$, tends to form fins or welts on the shoe, one longitudinally down the center of the shoe on top, and one along the edge where the sole joins the upper. Such fins detract from the appearance of the finished article, and, as it is one object of the invention to turn out shoes ready for sale and requiring no finishing process, I provide a shield $t'$, of aluminum, or some other light material. This is shown separately in Fig. 21. It is shaped to inclose the shoe after it has been made up on the last, and it completely covers the rubber at every point where there is a joint between the mold sections, except down the heel of the shoe, as at $t^2$, where the presence of the fin would not be objectionable, or even noticed. In Fig. 20, the shield $t'$ is shown enveloping the shoe and covering the joint where the two mold sections come together, and also the joints at the side edges where the top section joins the sides. The shield is preferably split down the back, as at $t^2$, and has no sole, as clearly indicated in the drawings. It is preferably formed of metal having some degree of flexibility, and should be polished on the interior where it comes in contact with the shoe. Its employment is not essential to the operation of the machine, but is only a desirable adjunct.

The construction and operation of the machine being as thus described, no further explanation seems necessary except by way of a brief recapitulation.

The shoe having been made up on a last, as before described, and the machine being stationary, with one of the molds in front of the operator's stand open to receive it, the last is inserted and adjusted in position between the mold sections on the peg formed by the pipe $r^2$. The mold then closes, the sides folding up and the top coming down to meet them, all three parts fitting together as shown in Fig. 20, and forming a hollow vulcanizing and molding chamber of the exact form of the shoe. Immediately on the closing of the molds, compressed air is admitted into the shoes, as already fully explained, and the mold carrier makes one-fourth of a revolution and again stops, while the same process is gone through with the second and each successive mold. When the carrier has made a complete revolution and the first mold again comes to rest opposite the workman's stand, the air is first exhausted from the shoe by the above described operation of the valve $f^7$. Immediately thereafter, the air is released from the cylinder $k$ by the same valve, and the locking mechanism of the mold sections is released. The springs thereupon throw open the mold, and the completed shoe is removed with its last, and a new last and green shoe are put in their place. By this time the wheel $r$ has been turned by the single tooth $y$ of the pinion $q$ sufficiently to again actuate the arm $a^4$, whereupon the mold carrier is unlocked and given a further one-fourth revolution. Immediately that the carrier starts, air pressure is admitted into the cylinder $k$ to close the mold, and air is turned into the shoes as soon as the mold is closed.

In regard to the operation of the molds, it is to be noted that, although the invention contemplates the complete opening and closing automatically, it may be found desirable, in order to prevent hammering and pounding, simply to release and lock them automatically, and open and close them partially by the automatic means, leaving either operation to be completed by hand. To this end, the mold tops and the detent $n^7$ may be provided with handles $s^6$ and $v^2$, and in claiming these movements, I desire to be understood as covering either a partial or complete opening or closing.

In respect of the operation of the mold carrier, it is to be noted that, for a given speed, the duration of the stoppages is dependent upon and regulable by the relative sizes of the wheel $r$, the pinion $q$, and the mutilated portion of the former.

What I claim and desire to secure is:—

1. In a machine for making rubber shoes and the like, the combination of a rotary mold carrier, a plurality of sectional molds carried thereby, means for rotating the carrier intermittently so as to stop the molds in succession before the operator, means for locking the carrier as each mold reaches the operator's position, and means for releasing the lock and resuming the rotation of the carrier after a predetermined interval; substantially as described.

2. In a machine for making rubber shoes and the like, the combination of a rotary mold carrier, a plurality of sectional molds carried thereby, means for rotating the carrier intermittently so as to stop the molds in succession before the operator, means for introducing and maintaining air pressure in the interior of the shoes when the molds are closed, and means for releasing the pressure when the mold reaches the operator's position; substantially as described.

3. In a machine for making rubber shoes and the like, the combination of a rotary mold carrier having a hollow journal, a plurality of molds carried thereby, a source of compressed air supply leading to the molds through the hollow journal of the carrier, and valved communications between the molds and the hollow carrier journal; substantially as described.

4. In a machine for making rubber shoes and the like, the combination of a rotary mold carrier, the notched disk $a^6$ on the shaft thereof, the arm $a^4$ oscillating on the carrier shaft, a spring pawl carried by the arm, a pitman for oscillating the arm, and a pawl releasing arm operated by the pitman; substantially as described.

5. In a machine for making rubber shoes and the like, the combination of the rotary mold carrier, the notched disk $a^6$ on the shaft thereof, the arm $a^4$ oscillating on the carrier shaft, a locking arm for holding the disk against rotation, a pitman for oscillating the arm $a^4$, and a connection between the locking arm and the pitman whereby the latter releases the lock; substantially as described.

6. In a machine for making rubber shoes and the like, a sectional mold comprising a pivoted top $c^2$ and pivoted sides $c^3$, $c^3$, means for raising and lowering the top, and connections between the top and sides whereby the latter are operated by the former; substantially as described.

7. In a machine for making rubber shoes and the like, a sectional mold comprising a pivoted top $c^2$ and pivoted sides $c^3$, $c^3$, connections between the top and sides, and means for operating the sections so that the top will open before the sides, and the sides will close before the top; substantially as described.

8. In a machine for making rubber shoes and the like, a sectional mold comprising a pivoted top $c^2$ and pivoted sides $c^3$, $c^3$, gear teeth $l^4$ on the trunnion of the top, similar gear teeth $l^6$ on the hubs of the arms of the sides, and a reciprocating rack $l^2$ having teeth meshing with those of the top and sides; substantially as described.

9. In a machine for making rubber shoes and the like, a sectional mold comprising a pivoted top $c^2$ and pivoted sides $c^3$, $c^3$, gear teeth on the trunnions of the top and sides, a reciprocating rack having teeth meshing with those of the top and sides, an arm $f^2$ projecting from the trunnion of the top $c^2$, and a pitman for operating the arm; substantially as described.

10. In a machine for making rubber shoes and the like, a sectional mold comprising a pivoted top $c^2$ and pivoted sides $c^3$, $c^3$, gear teeth on the trunnions of the top and sides, a reciprocating rack having teeth meshing with those of the top and sides, a spring $l^7$ reacting between the upper end of the rack and the top $c^2$, a spring $l^8$ acting against the lower end of the rack and serving to start it upward and cause its teeth to engage those on the top of the mold before those on the mold sides are engaged, and an operating arm for swinging the mold top on its pivot; substantially as described.

11. In a machine for making rubber shoes and the like, the combination of a mold carrier, a sectional mold comprising a top $c^2$ and sides $c^3$, $c^3$, a latch pivoted to the mold top and engaging a shoulder on the carrier to hold the top down, a detent on the latch engaging a plate on the carrier to hold the latch locked, and means for releasing the detent to unlock the latch; substantially as described.

12. In a machine for making rubber shoes and the like, the combination of a sectional mold comprising a top $c^2$ and sides $c^3$, $c^3$, gear teeth on the trunnions of the top and sides, a reciprocating rack having teeth engaged by those of the top and sides, a pneumatic cylinder and piston, an arm $f^2$ projecting from the trunnion of the mold top, a pitman connecting the arm with the piston, means for introducing air pressure to the cylinder on one side of the piston and releasing it therefrom, and a spring $g^2$ operating on the opposite side of the piston; substantially as described.

13. In a machine for making rubber shoes and the like, the combination of a sectional mold, means for opening and closing the mold, a detachable last or work support inclosed in the mold, means for pressing the sole of the last yieldingly against the top of the mold, and means for introducing air under pressure between the outer surface of the last and the inner surface of the shoe so as to press all parts of the shoe except the sole outward against the mold by air pressure; substantially as described.

14. In a machine for making rubber shoes and the like, the combination of a sectional mold and means for opening and closing it, a detachable last inclosed in the mold, a coupling $r^5$ projecting into the mold and having a flange shaped to make a tight joint with the edge of the opening in the mold through which the coupling projects, and means for introducing air pressure between the last and the shoe so as to press the edges of the shoe against and seal the joint between the mold sections and the coupling; substantially as described.

15. In a machine for making rubber shoes and the like, a last or work support having a cap $s'$ around the ankle portion, the cap fitting the last loosely and having a limited movement thereon to open up a passage $s^3$ through which air under pressure may be introduced between the outer surface of the last and the inner surface of the shoe; substantially as described.

16. In a machine for making rubber shoes and the like, a last or work support, provided with a passage which is confined to the outer surface of said support, in order to permit air under pressure to be introduced between the exterior of the last and the interior of the shoe, without first passing through the interior of the last; substantially as described.

17. In a machine for making rubber shoes and the like, the combination of a sectional mold, a last or work support inclosed therein, and a shield to envelop the last outside of the shoe and prevent the joints between the sections of the molds from causing fins or ribs to form on the shoe; substantially as described.

18. In a machine for making rubber shoes and the like, a sectional mold comprising a pivoted top, hinged sides, and means connecting the top and sides together and causing them to move concurrently.

19. In a machine for making rubber shoes and the like, a sectional mold comprising a top pivoted to swing in a plane lengthwise the mold, sides hinged to fold laterally, and means connecting the top and sides together for concurrent operation.

20. In a machine for making rubber shoes and the like, a sectional mold, a coupling projecting into the mold from the bottom thereof, and a detachable last provided at the ankle part with means for connection to the coupling in an inverted position.

21. The combination of a last, side molds, a top mold, and actuating means for said molds adapted to bring the side molds into contact with a shoe on the last at a relatively earlier time than the top mold.

22. The combination of a last, and a plurality of mold members, certain of which are movable into contact with a shoe on the last prior to certain other of the mold members.

23. The combination of a shoe-support, a plurality of oppositely-moving side molds, a top mold, means for actuating said top mold in driving or operating connection therewith, and power-transmitting means between the top mold and the side mold and operated by the movement of the means for actuating the top mold.

24. The combination of a shoe-support, a plurality of molds arranged adjacent to the support, and means for bringing certain of said molds into contact with the shoe on the support prior to certain other of the molds.

25. The combination with a last, a top or sole mold and side molds, means connected directly with and actuating the top mold, and power-transmitting means between the top mold and the side molds.

26. The combination of a hollow, adjustable shoe support, a plurality of molds each provided with a heating chamber, a motor for actuating all of said molds, and means for bringing certain of said molds into contact with a shoe upon the support at relatively earlier times than certain other of said molds.

27. The combination with a frame and a shoe-last, of a plurality of molds, means for closing certain of said molds about a shoe on the last at a relatively earlier period than certain other of the molds, and means for checking the movement of the molds first closed while the movement of the mold member last in closing is continued.

28. The combination with a rigid last-surface, of a plurality of oppositely-moving mold members, means for bringing said mold members to a stationary, closed position adjacent to the last, and means acting upon the last for advancing the same to its final position within the closed mold members.

29. In a machine of the class described the combination with the frame and a shoe-support thereon, of a sole-mold, and means for imparting movement to the sole-mold, such means comprising a sliding member, and means connected to the sole-mold and actuated by the sliding member.

30. The combination with the frame and the shoe-support thereon, a motor, a sole-mold, a member connected to the sole-mold and actuated by the motor, a second member arranged adjacent to the first member, and connected to the side molds, and means for transmitting power from the first to the second member whereby all of said molds may be actuated.

31. The combination with the frame and the work-support thereon, of side molds and the sole-mold, a motor, power-transmission means between the motor and all of the molds whereby said molds may be operated from the motor, and means for checking the movement of the side molds and permitting the continuation of movement of the sole-mold after the movement of the side molds has ceased.

32. The combination with the frame and the work-support thereon, of side molds and a sole-mold, means for actuating all of said molds simultaneously, and means for checking the movement of the side molds while the movement of the sole-mold continues.

33. In combination, rigid mold parts, a rigid last-surface part, means whereby the mold parts are advanced, means whereby a portion of the surface of the last opposed to said mold parts is held back from final position during the closing of the mold parts, and means whereby said portion of the last-surface is given its final advance toward said mold parts after the closing of the mold parts.

34. The combination with the side molds, of a rigid-surface shoe-support held out of final position when the side molds are closed, and means for moving the support into final position toward the side molds.

35. The combination with a mold member, of a rigid shoe-support held out of contact with the mold member when the latter is stationary and in its closed position, and means for advancing the shoe-support into contact and into final position relative to the mold member.

36. The combination with the side molds, of a last composed of inflexible material interposed between the same and held out of final molding position when the side molds are closed, and means for applying pressure to the last to advance the same toward and into final molding position relative to the closed molds.

37. In a machine of the class described the combination with a frame, of a last carried thereby, a support, and side molds, and a top mold hinged to said support.

38. In a machine of the class described the combination with a frame, of a last carried thereby, a support, a plurality of molds hinged to said support, means for swinging certain of said molds to and from the last, and means for moving certain other of the molds vertically relative to the last.

39. The combination with the frame, of a last, a support mounted on the frame, oppositely-moving side molds hinged to said support, a sole-mold also hinged to the support, and means for moving all of said molds toward and from the last.

40. The combination with a frame, of a shoe-last, a support, oppositely-moving side molds, and a sole-mold movably connected to said support, and means for closing certain of said molds about a shoe upon the last at a relatively earlier time than certain other of the molds.

41. The combination with the frame, of a last, a supporting-post, oppositely-moving side molds and a sole-mold hinged to said supporting-post, and means for closing the side molds about a shoe upon the last at relatively earlier times than the sole-mold.

42. In a machine for manufacturing rubber footwear, the combination of a work support, molds for forming the uppers of footwear, molds for forming the sole thereof, and means for automatically opening said molds at predetermined periods of time.

43. A last comprising a solid body portion over which is adapted to fit a boot or shoe, such last having a main channel extending therethrough and a branch channel communicating with and leading from the main channel, through which air may be passed to the space between the surface of the last and the interior of the boot or shoe.

44. A last comprising a solid body portion adapted to fit within the boot or shoe, an extension of said body portion having a main air-channel therein, and a second channel extending from the main channel through the body portion of the last whereby air may be introduced through the main channel and the second channel to the space between the last and the boot or shoe.

45. A last comprising a solid body portion provided with an extension having a main air-channel formed therein, and a second channel communicating directly with said main channel and extending therefrom through the solid portion of the body for conducting air from the air-channel to the space between the solid body portion and a boot or shoe surrounding the same.

46. A last comprising a body portion, an extension therefor having a fluid-channel formed therein, and a plurality of diverging channels adapted to conduct the fluid from the first-mentioned fluid-channel to the space between the outer surface of the last and a boot or shoe surrounding the same.

47. A last comprising a solid body portion formed of two united sections, the upper section comprising a plate, an extension member connected to the plate and having a main channel therein, said channel having laterally-extending passage-ways connected therewith to conduct fluid from the main channel to a point outside the body portion.

48. A last comprising a solid body portion, and an extension member connected therewith, said extension member having a vertical channel therein for the passage-way of a fluid, and a plurality of inclined diverging channels connected to the first-mentioned channel and extending through the body portion of the last, whereby fluid may be conducted from the main channel to the space between the exterior of the last and a shoe on such last.

In testimony whereof I affix my signature, in presence of two witnesses.

ANDREW SCHULZE.

Witnesses:
CHAS. J. O'NEILL,
CHARLES LOWELL HOWARD.